United States Patent [19]

Castelli

[11] Patent Number: 5,538,860
[45] Date of Patent: Jul. 23, 1996

[54] METHOD FOR THE LOCAL COMPOSTING AND DRYING OF ORGANIC WASTES AND RELATIVE DEVICE

[75] Inventor: Luigi Castelli, Trieste, Italy

[73] Assignee: Ecomaster SrL, Martignacco, Italy

[21] Appl. No.: 378,576

[22] Filed: Jan. 26, 1995

[30] Foreign Application Priority Data

Jan. 28, 1994 [IT] Italy .................. UD94A0014

[51] Int. Cl.⁶ .................. C12P 1/00; C05F 9/00
[52] U.S. Cl. .................. 435/41; 435/290.1; 435/290.4; 435/818; 435/819; 220/908; 71/14
[58] Field of Search .................. 435/287, 311, 435/313, 818, 290.1, 290.4, 819, 41; 422/120, 168; 220/4.09, 4.16, 4.34, 908; 71/14; D34/1

[56] References Cited

U.S. PATENT DOCUMENTS

| | | | |
|---|---|---|---|
| 5,096,080 | 3/1992 | Penny | 220/4.09 |
| 5,403,740 | 4/1995 | Menefee et al. | 435/287 |
| 5,417,736 | 5/1995 | Meyer | 71/9 |
| 5,429,945 | 7/1995 | Shain | 435/313 |

FOREIGN PATENT DOCUMENTS

| | | | |
|---|---|---|---|
| 2260883 | 6/1974 | Denmark | C05F 17/02 |
| 753608 | 10/1933 | France | C05F 17/02 |
| 9302990 | 7/1992 | WIPO | C05F 17/02 |

*Primary Examiner*—David A. Redding
*Attorney, Agent, or Firm*—Antonelli, Terry, Stout & Kraus

[57] ABSTRACT

Method and device for the local composting and drying of organic wastes, which is employed for the collection and aerobic conversion on the spot of organic wastes so as to obtain a finished product, compost, intended for use as an agricultural improvement material. A bag-type container (11) is filled with those organic wastes (19), the container (11) having at least flexible walls permeable to air, the container (11) cooperating in its interior with a tube (13) which is at least partially perforated and is closed at its lower end, the tube (13) being associated outside the container (11) with a fan (18), the fan (18) being activated to create a forced circulation of air within the container (11) in order to achieve conversion of the organic wastes (19) into compost and possible drying thereof.

24 Claims, 2 Drawing Sheets

METHOD FOR THE LOCAL COMPOSTING AND DRYING OF ORGANIC WASTES AND RELATIVE DEVICE

BACKGROUND OF THE INVENTION

This invention concerns a method for the local composting and drying of organic wastes and device therefor.

The invention is used in the field of the collection and conversion of solid or muddy organic wastes advantageously mixed with sawdust or another material which ensures the permeability of air so as to provide a finished product known in the art as "compost".

This finished product, compost, is commonly used in the agricultural field to enrich and to fertilise land intended for cultivation.

The invention makes possible a localised conversion on the spot of the collected organic wastes or wastes produced at the same place, thus avoiding recourse to specific composting plants of great sizes.

By composting the wastes is meant the aerobic degradation of biodegradable material in the form of wastes so as to obtain a finished product mainly intended for use as a product for agricultural improvement.

The conversion and stabilisation of organic wastes known as composting have to take place in the presence of oxygen, and, for a good conversion to be achieved, anaerobic conditions should not take place.

The most active step in the composting of wastes is carried out under conditions of forced ventilation and may last from a minimum of 5 to 7 days to a maximum of about 15 to 20 days depending on the type of the wastes, the quantity of air employed, the outside atmospheric conditions, etc.

So as to speed up the degradation of the biodegradable organic material, the wastes are advantageously, but not necessarily, ground beforehand into particles of small sizes.

The muddy biodegradable wastes such as those arising from the purification of urban waste waters, can be composted by being mixed with sawdust, wood chips or another material which makes the mass of the wastes permeable to air.

According to the state of the art the humidity content in the mass of wastes is stabilised at a value of about 50 to 60% so that the biological activity can proceed at the best speed.

Moreover, if it is necessary to make the composting process proceed at a greater speed, to the mass of wastes may be added solutions having a high nitrogen content so that the carbon:nitrogen ratio is adjusted to an optimum value estimated to be about 35:45.

In the state of the art the processes of composting the organic wastes are carried out in appropriate specifically designed plants generally equipped with collecting and containing vessels of great sizes in which the conversion and degradation of the collected wastes are performed.

The operators of such plants typically carry out the collection of the wastes, the transporting of those wastes to the specific composting plant, the possible sorting of the wastes, the conversion and exploitation thereof and the possible marketing of the finished compost.

All the above processes entail great expenses, above all for firms of small and medium sizes, for instance firms in the foodstuffs field, which produce organic wastes in great quantities and have to make use of the operators of such plants for the disposal and treatment of the wastes.

Considerable expenses are also borne by the community in general, which has to incur the burden of the collection and conversion of its own organic wastes as performed exclusively in such specialised plants.

With regard to the evermore active tendency towards the differentiated collection of wastes, which will lead, and in some countries already leads, to more and more strict regulations regarding the upstream sorting of wastes on the basis of their type, it will be possible in the near future to perform the differentiated collection of organic wastes which can be used at once for composting treatment.

SUMMARY OF THE INVENTION

In this connection the present applicants have tackled the problem of providing a device suitable to perform the local composting and drying on the spot of the organic wastes, thus reducing to a minimum the costs of collection, treatment and transport.

For this purpose the present applicants have designed, tested and embodied a method and relative device, which has a simple and functional design and embodiment, which overcome the above problems of the state of the art and enable further advantages to be achieved.

The purpose of the invention is to provide a method, and relative device, by which it is possible to obtain, substantially at the position of production, a treatment for the composting and drying of sorted organic wastes.

The invention enables the organic wastes, which otherwise could not be handled and transported, to be converted directly on the spot into a stable product which can be readily transported and marketed.

For transporting the finished compost, the same container is advantageously employed as is used for the step of conversion into compost, thereby simplifying considerably the whole method of handling the material.

The invention provides the double financial advantage that the firm, municipality or other body performing the collection of the organic wastes and using this device does not have to make use of specialised plant operators with the resulting financial burden but obtains at the end a product from which a financial return can be achieved.

A possible system of collection and treatment within the individual authority along the roads at appointed places or at variously positioned collection centers may include a plurality of devices according to the invention.

In this way, while one or more of these devices are at work in treating and converting the organic wastes, the other devices are performing the progressive and continuous filling steps.

The device according to the invention consists substantially of a bag-type container made of a flexible fabric permeable to air, within which is inserted a tube that is partly perforated and is closed at its lower end.

Such a bag-type container is available on the market and is used for various purposes, such as the collection of sludges or other products.

This container has a height reaching typically about 1.2 to 1.6 meters but smaller or greater sizes can be employed in an analogous manner within a given range.

One of the materials preferred for use in the making of these bag-type containers consists of plaited or woven polyester or polypropylene fibers.

According to the invention the perforated tube made of a plastic or metallic material is connected at its upper end to a fan suitable to aspirate air outwards from the inside of the container or, vice versa, to blow air into the container.

According to a variant the fan is designed to perform alternate aspiration and blowing cycles.

Moreover, the fan can be programmed to perform a continuous cycle with a low intensity of aspiration or blowing during the whole period of the treatment, or else to perform periodical cycles of a greater intensity.

The permeability of the walls of the container together with these aspiration and/or blowing cycles achieves a forced circulation of air within the container, and this forced circulation provides, within a variable period of time of about 12 to 18 days for instance, the compost and the reduction of humidity of the wastes.

The tube placed within the container can advantageously be withdrawn and re-used when the treatment and conversion of the organic wastes into compost have been completed.

For this purpose the tube may have advantageously a downward tapered conformation to facilitate its withdrawal.

According to a variant the tube has an outer helicoidal conformation to enable it to be introduced, when the container is full, by being screwed and to be withdrawn by being unscrewed when the conversion has taken place.

The bag-type container too can be of a type which can be re-used after discharge of the finished product obtained.

The bag-type container typically has a tubular conformation, a suitable upper filling inlet and straps for its lifting.

The containers are also produced in standardised sizes according to international haulage standards.

According to the invention the bag-type container is associated advantageously with underlying means, of a vessel type for instance, to collect any liquid which has percolated through.

According to a variant the bag-type container includes upper and lower covering means which prevent the passage of air and thus prevent the creation of preferred paths for the air and ensure a constant and uniform circulation through the mass of waste inside the container.

According to the invention a fan may tend two or more containers.

According to a variant a fan can be used to aspirate air from a first bag-type container and to blow the same air into a second bag-type container.

According to another variant the fan in the blowing step cooperates downstream with heating means to blow heated air into the container and to speed up the conversion and the rendering hygienic of the organic wastes.

According to yet another variant the fan in the aspiration step cooperates downstream with filter means to filter and purify the air aspirated from the interior of the first container before that air is released to the surrounding environment.

The same container full of compost which is now mature, but still not dry, can be used as a biofilter to control the smells.

According to still another variant the flexible and permeable bag-type container cooperates with an outer rigid or flexible airtight container, from which only the central tube emerges.

This outer container ensures a more hygienic condition and the retaining of percolated liquids and prevents the spreading of evil smells in the surrounding environment, etc.

BRIEF DESCRIPTION OF THE DRAWINGS

The attached figures are given as a non-restrictive example and show some preferred embodiments of the invention as follows.

DETAILED DESCRIPTION OF THE PREFERRED EMBODIMENTS

Figures 1, 2:
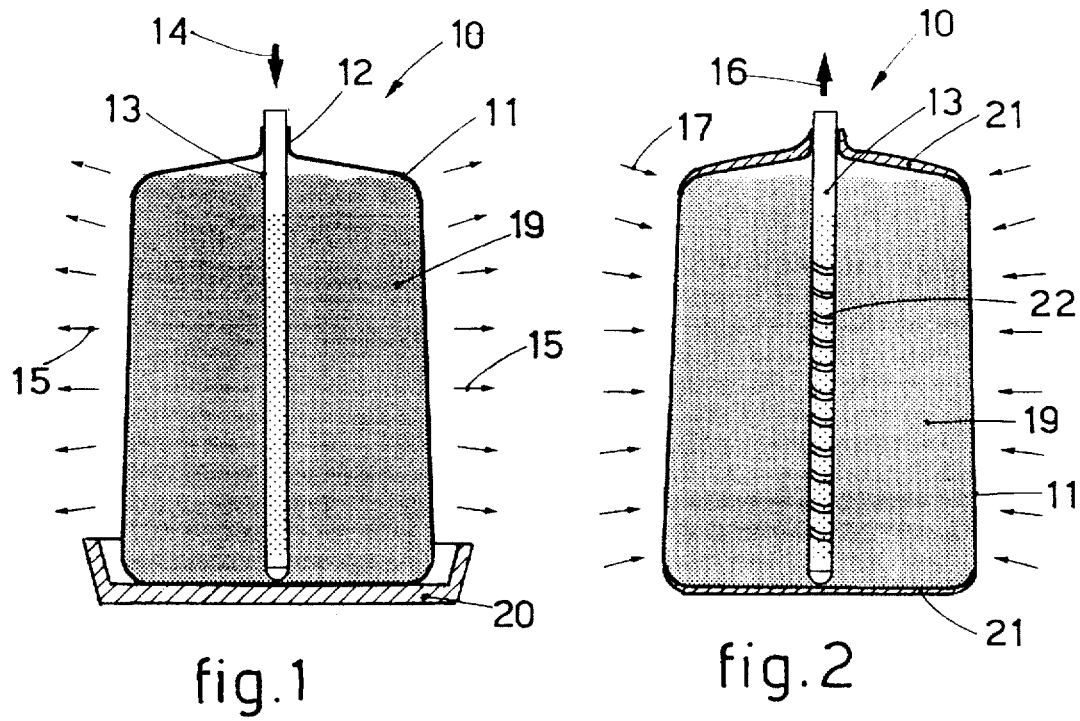
FIG. 1 shows a section of a possible form of embodiment of the device according to the invention.
FIG. 2 shows a variant of FIG. 1.

A device for the local composting and drying of organic wastes according to the invention is referenced with 10 in FIG. 1.

This device 10 comprises at least one bag-type container 11 made of a flexible material permeable to air, for instance made of a synthetic material produced by the plaiting or weaving of polypropylene fibers or another analogous material.

The bag-type container 11 has at its upper end a filler inlet 12 for the introduction of sorted organic wastes 19 and may include straps and/or a hook (not shown here) so that it can be engaged and carried.

A tube 13 made of a metallic or plastic material and at least partly perforated is inserted into the bag-type container 11 normally before introduction of the wastes 19 and is closed at its lower end and protrudes at least along its own upper end from the filler inlet 12.

When the bag-type container 11 has been filled with organic wastes 19, the filler inlet 12 is clamped about the upper end of the tube 13, and the cycle of treatment and conversion of the organic wastes 19 is started in the presence of oxygen so as to compost those wastes 19.

This composting is achieved by a forced circulation of air within the bag-type container 11; this circulation takes place, according to the example of FIG. 1, by blowing air into the tube 13 according to the arrow 14 and thereafter discharging the air outwards according to the arrows 15 through the permeable walls of the bag-type container 11.

In the example of FIG. 2 the circulation takes place by aspiration of the air from the inside of the bag-type container 11 outwards (arrow 16) and the replenishment of this air into the bag-type container 11 (arrows 17) through the permeable walls of the bag-type container 11.

So as to achieve these cycles of aspiration and/or blowing, the tube 13 is associated with at least one fan 18 (see FIG. 3 for instance) with a relative system of tubes and gate valves.

This fan 18 can be designed to perform only aspiration cycles or blowing cycles or may be suitable to perform alternate aspiration and blowing cycles.

This fan 18 can also be programmed to carry out a continuous cycle during the whole period of the treatment of the organic wastes 19 or to carry out periodic cycles of a pre-set regulated length within the treatment period.

In the embodiment of FIG. 1 the bag-type container 11 is associated at its lower end with a retaining vessel 20 for collection of percolated liquids and for preventing direct contact between the bag-type container 11 and the underlying ground.

Another embodiment, which is not shown here, may include an inner or outer impermeable flooring with a retaining edge to collect the percolated liquid.

The percolated liquids collected may possibly be recycled in the same container or in other containers where a drier material is held.

Moreover, water may be added periodically to the contents of the bag-type container 11 for the purpose of keeping the humidity of the material close to the optimum value for composting.

In the example of FIG. 2 the bag-type container 11 comprises at its upper and lower parts covers 21, which are airtight and prevent the creation of preferred passages for the air through the walls of the container 11.

Moreover, in FIG. 2 the tube 13 has a helicoidal superficial conformation 22 to enable it to be inserted into a full container and to be withdrawn when the treatment cycle has ended.

Figure 3:
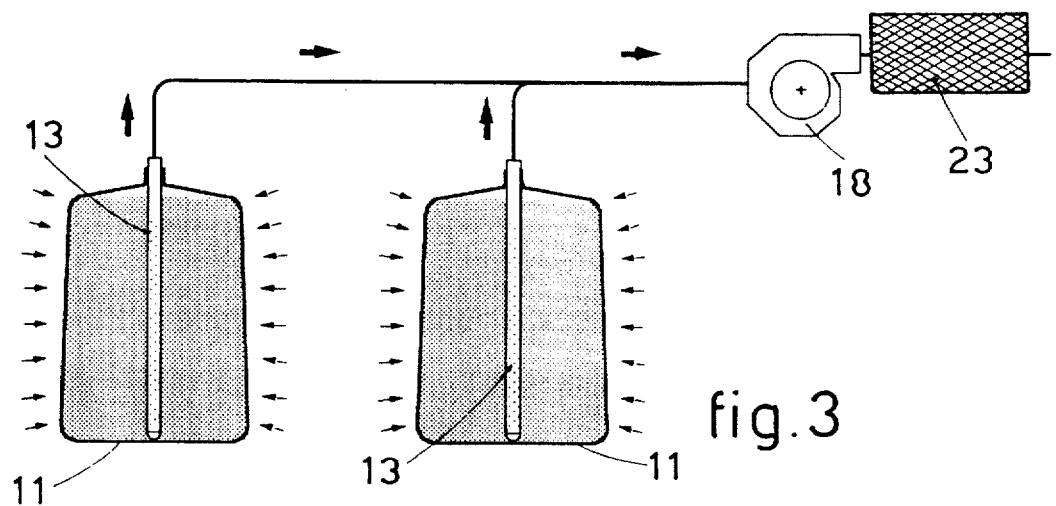
FIG. 3 shows a diagram of an embodiment according to the invention.

The embodiment of FIG. 3 illustrates the case where one single fan 18 tends two bag-type containers 11 and is connected, for aspiration in this case, to both the tubes 13 placed in those containers 11.

Before being released into the surrounding environment the air aspirated from the bag-type containers 11 may possibly be purified by filter means 23.

Figure 4:
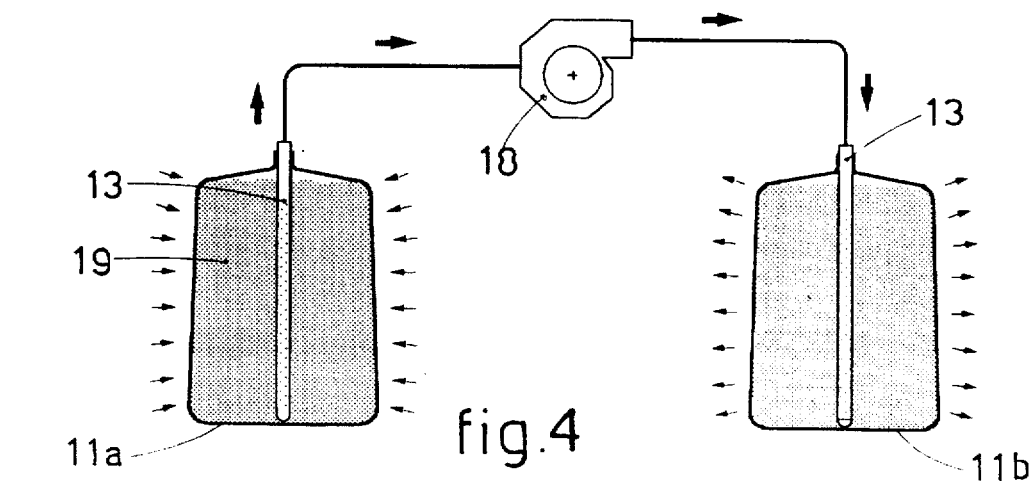
FIG. 4 shows a variant of FIG. 3.

In the embodiment of FIG. 4 the air aspirated by the fan 18 from the inside of a first bag-type container 11a is blown by the same fan 18 into a second bag-type container 11b. This embodiment can be used to eliminate evil smells arising from the organic wastes 19 in the first container 11a in the case where a stable and not yet dried compost is held within the second container 11b.

This embodiment can also be used for the removal of evil smells inside smelly facilities such as stalls, pigsties, plants for the initial processing of leather and skins, etc., and also remove smells from the air before its release into the environment or into its originating area itself.

Figure 5:
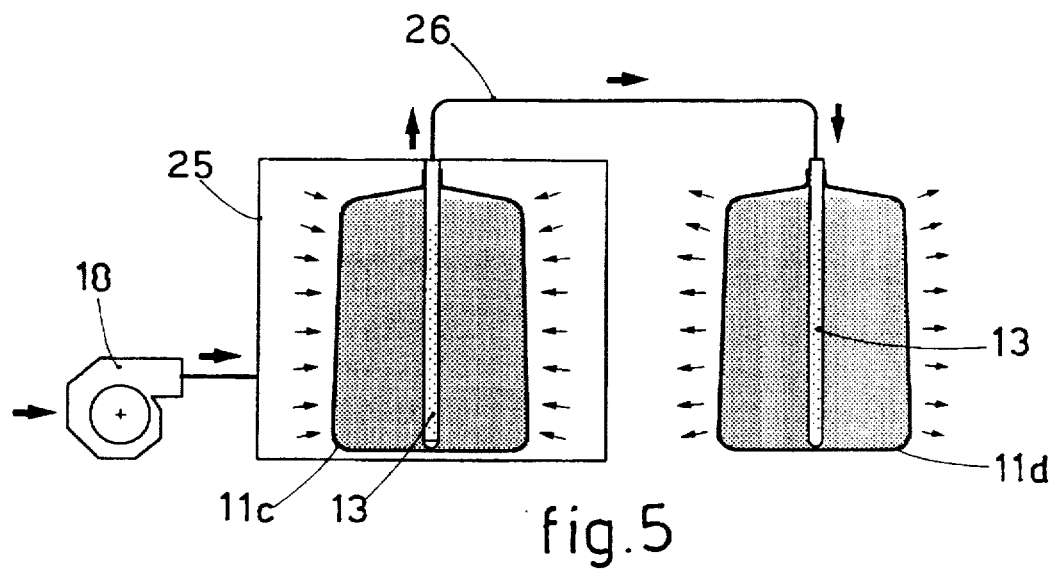
FIG. 5 shows another variant of FIG. 3.

FIG. 5 shows another variant in which at least one of the bag-type containers 11c is closed within an outer airtight container 25, which in this case is of a rigid type.

In this example the air blown by the fan 18 into the outer airtight container 25 penetrates into the bag-type container 11c through the walls of the latter.

This forced draught of air is then conveyed out of the outer bag-type container 11c through the tube 13 and is conveyed through a connecting tube 26 into the second container 11b through the relative tube 13; the air is released from the second container 11b into the surrounding environment through the relative permeable walls.

The inclusion of the outer container 25 ensures better hygienic conditions, a better retaining of the smells, a conversion of the wastes less conditioned by the external atmospheric conditions, etc.

In this case the air may be heated to control the pathogens also on the surface.

Moreover, this outer container 25 provides greater safety against dangers of damage and breakage of the bag-type container 11, such damage or breakage being also very unlikely owing to the strength of a container 11 of this type.

Figure 6:
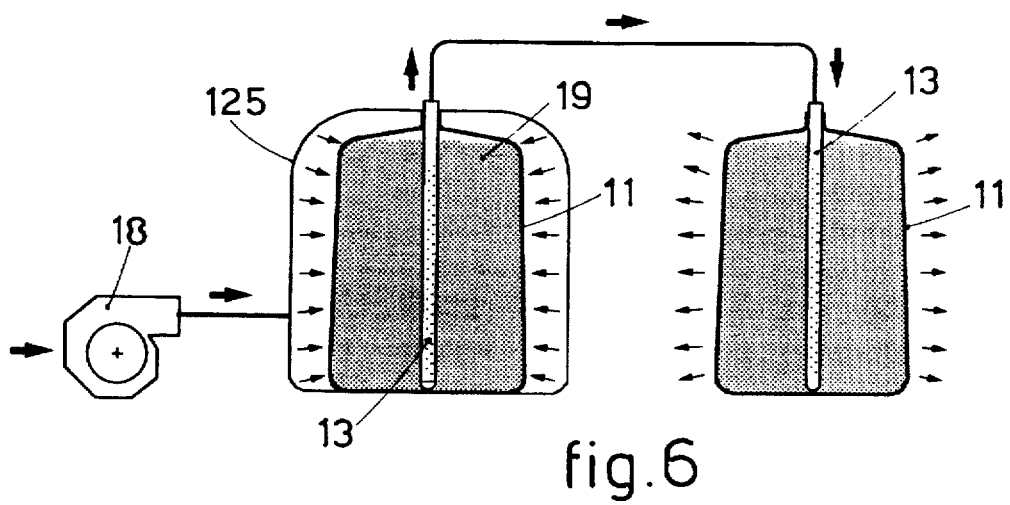
FIG. 6 shows a variant of FIG. 5.

The variant of FIG. 6 shows the case where the outer container 125 is of a flexible type.

Figure 7:
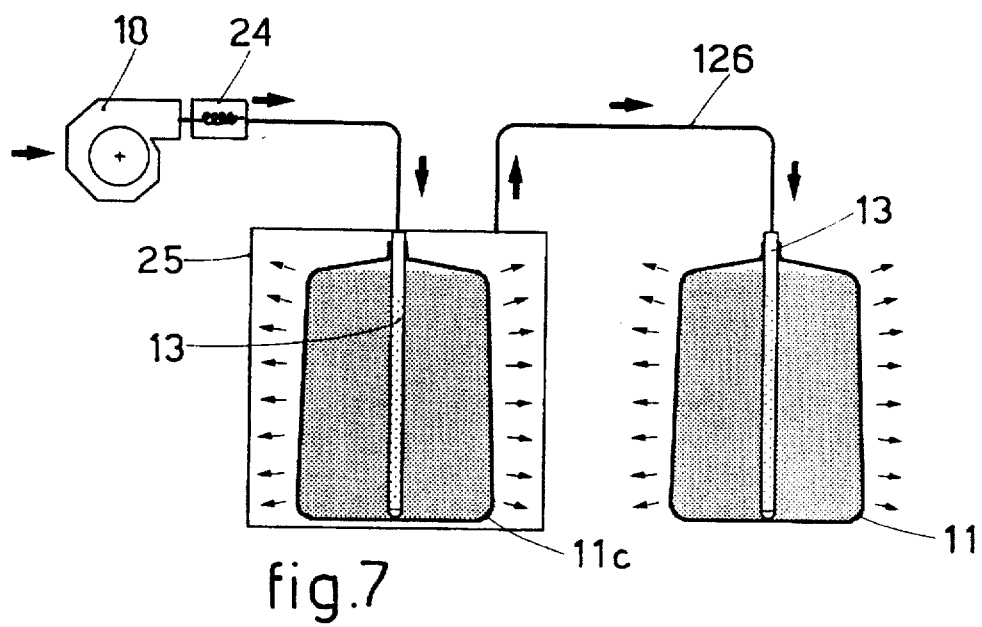
FIG. 7 shows another variant of FIG. 5.

Lastly the variant of FIG. 7 provides a different diagram of the circulation of air as compared to that of FIG. 5. In this case the air possibly heated by suitable heating means 24 and blown into the first container 11c positioned inside the outer container 25 is fed, through the walls of the first container 11c and through a second tube 126 connected to the interior of the outer container 25, into the tube 13 inserted into the second container 11d.

I claim:

1. Method for the local composting and drying of organic wastes, which is employed for the collection and aerobic conversion on the spot of organic wastes so as to obtain a finished product, compost, intended for use as an agricultural improvement material, the method comprising filling a bag-type container with the organic wastes, the container having at least flexible walls permeable to air and a tube which is at least partially perforated and closed at its lower end, the lower end of the tube being provided inside the container, and an upper end of the tube being associated outside the container with a fan, and activating the fan to create a forced circulation of air within the container in order to achieve conversion of the organic wastes into compost and drying thereof.

2. Method as in claim 1, wherein activating the fan provides for aspiration of the air by the fan through the relative tube, forcing the air to transit from the exterior of the container towards the inside.

3. Method as in claim 1, wherein activating the fan provides for blowing of the air by the fan through the relative tube into the container.

4. Method as in claim 1 wherein forced circulation of air is carried out with a continuous and substantially constant cycle during a whole period of a cycle of conversion of the organic wastes.

5. Method as in claim 1, wherein the forced circulation of air is carried out with a periodic cycle and with an adjustable intensity during a whole period of a cycle of conversion of the organic wastes.

6. Method as in claim 1, further comprising collecting and retaining percolate liquid in a retaining vessel provided at a lower end of the container.

7. Method as in claim 1, wherein activating the fan creates a forced circulation of air within at least two containers.

8. Method as in claim 3, further comprising heating the air by means of heating means located downstream of the fan.

9. Method as in claim 3, further comprising filtering the air by a filter located downstream of the fan.

10. Method as in claim 1, wherein the organic wastes in the container generate foul smells, and further comprising capturing the air circulated through the container and blowing the air containing the foul smells through a second container containing mature but not yet dry compost used as biofilter for removal of the foul smells.

11. Device for the local composting and drying of organic wastes, which is employed for the collection and aerobic conversation on the spot of organic wastes so as to obtain a finished product, compost, intended for use as an agricultural improvement material, comprising at least one container suitable to be filled with the organic wastes, the container having at least flexible walls permeable to air; a tube which is at least partially perforated and closed at its lower end, the lower end of the tube being provided inside the container, and an upper end of the tube being provided outside the container; and a fan operably connected to the upper end of the tube suitable to create a forced circulation of air within the container so as to achieve conversion of the organic wastes into compost and possible drying thereof.

12. Device as in claim 11, wherein the fan is arranged so as to be able to aspirate, through the relative tube, the air from the inside of the container towards the exterior.

13. Device as in claim 11, wherein the fan is arranged so as to be able to blow, through the relative tube, the air into the container.

14. Device as in claim 11, further comprising a retaining vessel to collect and retain percolated liquid, the retaining vessel being placed below the container.

15. Device as in claim 11, further comprising, in cooperation at least with the upper and lower sides of the container, an airtight cover.

16. Device as in claim 11, wherein the fan is a single fan and the at least one container comprises a plurality of containers, the single fan being provided in cooperation with the plurality of containers.

17. Device as in claim 13, further comprising heating means provided downstream of the fan for heating air blown into the container.

18. Device as in claim 12, further comprising a filter provided downstream of the fan for filtering air aspirated from the container.

19. Device as in claim 11, wherein the tube can be withdrawn and re-used.

20. Device as in claim 19, wherein the tube has a tapered conformation with its vertex facing downwards.

21. Device as in claim 19, wherein the tube has an outer helicoidal conformation.

22. Device as in claim 11, further comprising an outer airtight containing means provided around the container.

23. Method as in claim 1, further comprising adding a bulking agent to the organic waste before activating the fan.

24. Method as in claim 23, wherein the bulking agent is sawdust.

* * * * *